United States Patent [19]
Hacker

[11] Patent Number: 5,377,859
[45] Date of Patent: Jan. 3, 1995

[54] COVER FOR PAN HAVING VARIABLE CONVENTIONAL WIDTHS

[75] Inventor: Terry F. Hacker, Manitowoc, Wis.

[73] Assignee: Anchor Hocking Corporation, Freeport, Ill.

[21] Appl. No.: 37,852

[22] Filed: Mar. 29, 1993

Related U.S. Application Data

[63] Continuation-in-part of Ser. No. 860,941, Mar. 31, 1992, abandoned.

[51] Int. Cl.⁶ .............................................. B65D 51/00
[52] U.S. Cl. .................................... 220/287; 220/355; 220/912
[58] Field of Search ...................... 220/287, 212, 212.5, 220/306, 355, 356, 731, 912; D7/538, 540, 542, 392.1; D9/454, 435

[56] References Cited

U.S. PATENT DOCUMENTS

| | | | |
|---|---|---|---|
| 893,469 | 7/1908 | Essmuller | 220/287 X |
| 1,361,348 | 12/1920 | Pfisterer | 220/287 |
| 1,441,712 | 1/1923 | Picard | 220/287 |
| 1,843,918 | 2/1932 | Cornell | 220/212 X |
| 2,047,720 | 7/1936 | Wilhelm | 220/355 |
| 2,247,230 | 6/1941 | Foster | 220/356 X |
| 2,643,024 | 6/1953 | Cronheim | 220/287 X |
| 2,736,536 | 2/1956 | Banowitz | 220/287 X |
| 2,760,672 | 8/1956 | Cronheim | 220/287 |
| 3,606,074 | 9/1971 | Hayes | 220/287 X |
| 3,807,457 | 4/1974 | Logsdon | 220/287 X |
| 5,125,393 | 6/1992 | Levitin | 220/912 x |

Primary Examiner—Allan N. Shoap
Assistant Examiner—Vanessa Caretto
Attorney, Agent, or Firm—Baker & McKenzie

[57] ABSTRACT

A cookware cover is provided for standard size cookware of nominally varying diameters. Specifically, one cookware cover is provided that will adequately cover frying pans, sauce pans, stock pots and other cookware of one standard size and manufactured by a variety of manufacturers. One cookware cover is provided that will fit the variations of nominal conventional dimensions and rim configurations that exist from manufacturer to manufacturer.

4 Claims, 2 Drawing Sheets

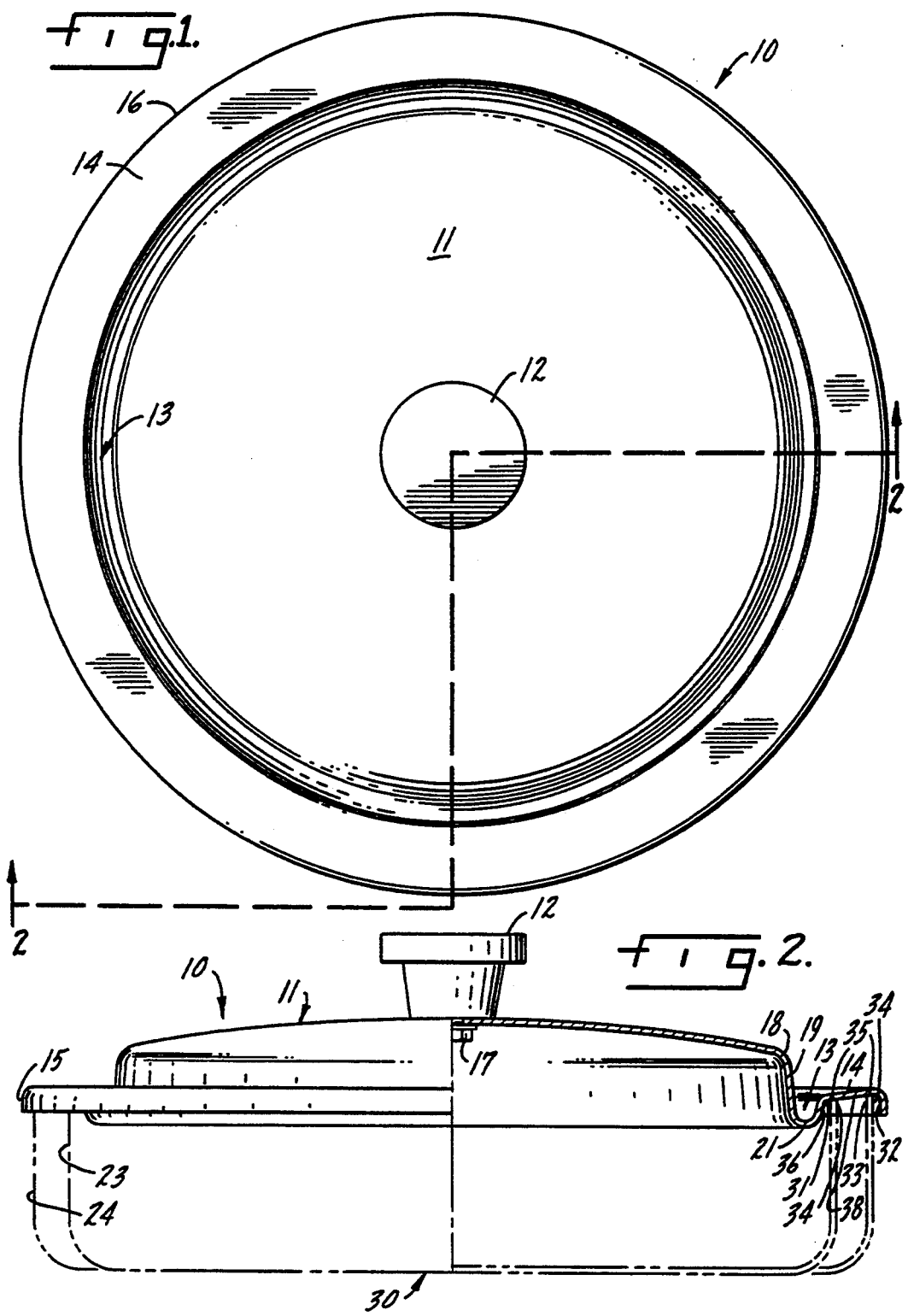

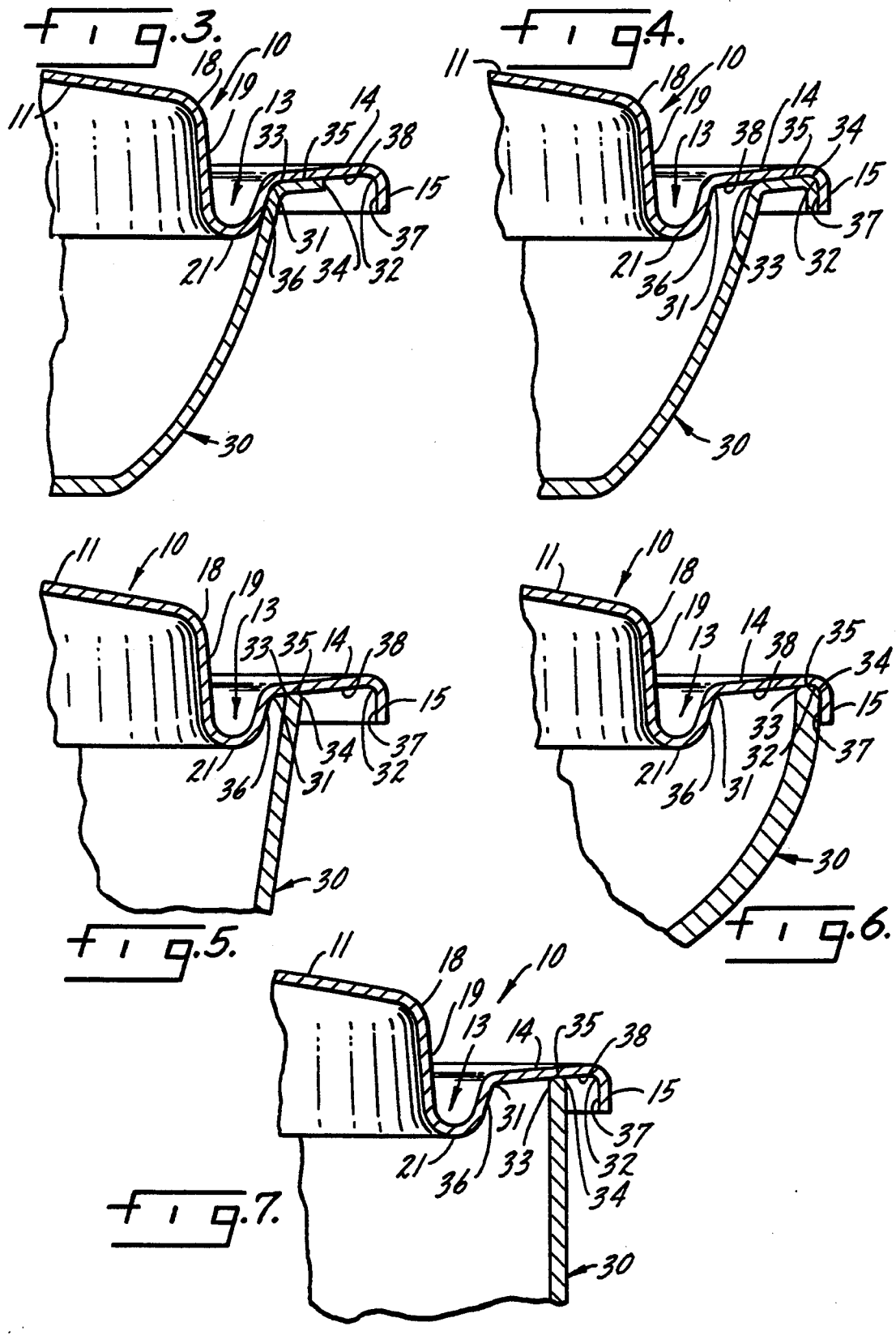

COVER FOR PAN HAVING VARIABLE CONVENTIONAL WIDTHS

This is continuation-in-part of application Ser. No. 07/860,941, filed on Mar. 31, 1992, now abandoned.

This invention relates generally to covers for cookware and specifically to a cover for pots and pans of nominally the same size, but actually of different sizes. More particularly, this invention pertains to a cookware cover for pots and pans of nominally the same size which are fabricated by different manufacturers and which pots and pans differ significantly in diametrical size and configuration.

BACKGROUND OF THE INVENTION

Many frying pans, saute pans, sauce pans and other cookware are sold without an accompanying lid or cover. Further, when a pan is sold with a cover, often the cover is either lost or broken before the working life of the pan has ended. Thus, there is a market for, and a need for, replacement covers for most types of cookware.

When designing replacement covers for cookware, a cover manufacturer is confronted with the problem of standard sizes of cookware that vary in diameter from manufacturer to manufacturer though they are nominally the same size and are marketed as such. Specifically, a 10-inch frying pan made by one manufacturer will be slightly larger or smaller in diameter than a 10-inch frying pan made by a second manufacturer. Further, the diameters and thicknesses of the rims of cookware may vary from model to model. For example, frying pans are generally made of a thicker material than sauce pans. Finally, the upper rims of pans vary in configuration. Some upper rims are relatively vertical, some are flared outwardly and others are beaded. Variations in the rim design will cause variations in the diameter of the rim.

The Cookware Manufacturers Association sets standards for cookware sizes. Cookware items calling for a diameter measurement should measure in inches (or centimeters) as indicated on the label with allowable manufacturing tolerances of $\frac{1}{4}$ inch (or 6 millimeters). For example, to be in tolerance, a 10 inch frying pan may range from about 9.75 inches to 10.25 inches.

The problem arises when a consumer purchases replacement or additional covers for the cookware he or she owns. A 10-inch frying pan cover may not fit a 10-inch sauce pan and a 10-inch frying pan cover made by a first manufacturer may not fit a 10-inch frying pan made by a second manufacturer. Simply put, cookware covers are not presently interchangeable due to variations in pan diameters that occur from model to model and manufacturer to manufacturer.

Thus, there is a need for covers and replacement covers for cookware that will comfortably fit the standard size cookware produced by a variety of manufacturers and fit all the models of each standard size. For example, there is a need for a replacement cover for 10-inch cookware that will fit 10-inch cookware made by all manufacturers and also fit the 10-inch frying pans, 10-inch sauce pans and 10-inch stock pots made by all manufacturers.

In addition to the need generally to provide a cover which will fit pans of nominally the same but actually different dimensions, it is highly desirable that such a cover be so constructed as to snugly fit the container top with which it is used. In order to avoid excessive looseness between the container top and the cover it is desirable, if at all possible, to have the outside diameter of the container form a close fit with an inwardly-facing vertical surface of the universal cover, or the inside surface of the container form a close fit with an outwardly-facing vertical surface of the cover.

The provision of a snug, though not vapor-proof, fit is desirable for many reasons including the elimination of an annoying rattle which can occur if the container is filled with a liquid to nearly its top edge and a vigorous boil is created; the force of the boil often has a tendency to jiggle sideways or lift and drop the lighter, unrestrained cover which can generate a continuous rattle which is displeasing to the ear. If there is a snug, or simply a close fit between adjacent, relatively vertical surfaces on the cover and the container, the above-described annoying tendency to rattle is totally eliminated or at least significantly reduced.

Another advantage in having snug or at least close fitting surfaces between adjacent vertical surfaces on the container and a universal cover is to reduce spillage during handling of the container-cover combination during use. When, for example, a container-cover assembly is full nearly to overflowing with a liquid, the snug or close fit of the container and cover minimizes the spill over tendency of the liquid in the container. With a snug fit for example, the movement of liquid in a nearly filled container toward a side wall area due to a jarring, or tipping during transfer due to lack of hand strength by the user, will follow the same motion as does a wave when it splashes against a vertical sea wall; the uppermost liquid may rise but is largely or entirely restrained from rising up to and over the top of the vertical surface.

Prior workers in the art have recognized the need but the proposed solutions have fallen far short of meeting the need. Dantel (U.S. Pat. No. 1,310,981) for example, discloses a cover suitable for a number of different sized pots, but Dantel's rim "b" is so wide that only a small percentage of the pots with which it would be used would place adjacent non-horizontal surfaces in close juxtaposition with one another, and even if a particular pot-cover combination did achieve a close proximity of adjacent surfaces on the pot and cover, the substantial incline of the non-vertical portion of Dantel's cover would preclude a snug or even a close fit and hence the advantages achieved herein by applicant's construction would not be obtainable.

Foster (U.S. Pat. No. 2,247,230) also discloses a cover which is said to be reusable with containers of different diametrical dimensions. The Foster structure, however, is designed and intended to have a mode of operation directly contrary to the mode of operation of the herein disclosed invention. Thus, in Foster, no substantially vertically oriented surfaces are provided on the cover within the intended range of pot diameter with which the Foster cover is to be used, and hence the possibility of a snug fit, or even a close fit, between adjacent generally vertically oriented surfaces on a pot and Foster's cover would be mechanically possible. The Foster design is no doubt quite efficient for its intended purpose which is to facilitate the removal of liquids from the container, as would be the case when the pot-cover was tipped 90° to drain the cooking water away from potatoes, but, as is obvious from the foregoing, this feature is directly contrary to what applicant seeks to guard against which is the boil-over of liquids from the container and to minimize if not eliminate the rattle which would inevitably occur between Foster's cover 12 and pot 11 when a vigorous boiling action is in progress with the boiling liquid very near the top of the pot 11. In effect, Foster teaches directly contrary to the herein described concept.

Thus, the need for a cover which is, in effect, universally reusable with all containers having the same nominal size, and which will act to retain liquid in the container rather than facilitate its egress has remained unsolved by prior workers until now.

It will be understood that applicant's invention is not a true universal cover in the sense that one structurally rigid cover fits all sizes of containers, i.e. 6 inch, 8 inch, 10 inch and 12 inch containers. Rather, applicant's cover is universal in the sense that it makes a snug or close fit with all or a very large majority portion of containers of the same nominal size; i.e. all 6 inch containers or all 8 inch containers etc., but not all 6 inch and 8 inch containers.

BRIEF DESCRIPTION OF THE INVENTION

The present invention makes a significant contribution to the cookware industry by providing an improved cookware cover that will fit all models made by all manufacturers in each standard size. The present invention accomplishes this without costly design modifications and the modifications incorporated by the present invention do not affect the aesthetics or appearance of the cover.

The cookware cover includes a central portion that covers the majority of the surface area of the pan. A handle is normally mounted at the center of the central portion. The central portion extends generally radially outward to a reverse curve portion or straddle portion. The reverse curve or straddle extends generally downward and then curves upward forming an inner lip or protuberance that fits inside or snugly against the interior surface diameter of the pan to be covered. The reverse curve or straddle extends generally vertically upward to the flange. The flange extends generally radially outward to the skirt. Finally, the skirt extends generally vertically downward and provides an outer lip which fits outside or against of the exterior diameter surface of the pan to be covered.

The upper rim of a pan is disposed within three surfaces. The outwardly-facing exterior surface of the straddle, the downwardly-facing undersurface of the flange, and the inwardly-facing interior surface of the skirt. The exterior surface of the straddle will provide a snug fit with the inner surfaces of many pan rims. The interior surface of the skirt will provide a snug fit with the outer surfaces of many pan rims.

The flange provides an annular area or circular ring section that is wide enough to accommodate the nominal size variations which occur between frying pans, sauce pans and stock pots of a single conventional size, such as 10-inch or 12-inch. Further, the annular area provided by the flange also provides for the nominal size variations in interior and exterior pan diameters that occur from manufacturer to manufacturer. Thus, the present invention provides one cover, or replacement cover, for each standard size of cookware. For example, one 10-inch replacement cover made in accordance with the present invention will fit a 10-inch frying pan, a 10-inch sauce pan, a 10-inch stock pot and other 10-inch cookware. Similarly, a single 10-inch replacement cover made in accordance with the present invention will fit the 10-inch cookware manufactured by a variety of manufacturers.

It is therefore an object of the present invention to provide a single standard sized cover for cookware manufactured by a plurality of manufacturers.

It is also an object of the present invention to provide a single cover, or replacement cover, for frying pans, sauce pans, stock pots and other cookware of a single standard size.

Yet another object of the present invention is to provide a snug fit at either the inner surface or outer surface of pan rims that fall within the range of pan diameters accommodated by the flange of the pan cover of the present invention.

BRIEF DESCRIPTION OF THE DRAWINGS

This invention is illustrated more or less diagrammatically in the accompanying drawings wherein:

FIG. 1 is a top plan view of a cover for a cooking vessel made in accordance with the present invention;

FIG. 2 is a partial section taken substantially along line 2—2 of FIG. 1 illustrating the ability of the cover made in accordance with the present invention to accommodate cookware of varying diameters;

FIG. 3 is a side sectional view of the cover shown in FIG. 2 accommodating a cooking vessel having an outwardly flared upper lip configuration;

FIG. 4 is a side sectional view of the cover shown in FIG. 2 accommodating a cooking vessel having yet another outwardly flared lip configuration;

FIG. 5 is a side sectional view of the cover shown in FIG. 2 accommodating a cooking vessel having a relatively vertical lip configuration;

FIG. 6 is a side sectional view of the cover shown in FIG. 2 accommodating a cooking vessel having a bowl-shaped configuration; and FIG. 7 is a side sectional view of the cover shown in FIG. 2 accommodating a cooking vessel having yet another relatively vertical lip configuration;

DETAILED DESCRIPTION OF THE INVENTION

Like reference numerals will be used to refer to like or similar parts from Figure to Figure in the following description of the drawings.

The improvement provided by this invention is best understood after consideration of the problems encountered by a cook hurriedly searching for the appropriate cookware lid while attempting to prepare a multi-course meal. For many food preparations, it is important to have a lid that properly fits the pan. Also, hot liquids will not easily spill out of a pan that is equipped with a cover that fits properly. The snug fit may be provided at an inside or outside surface of the pan at or near the upper rim.

Many manufacturers make lids designed specifically for one of their line of cookware. As noted above, the lid may be either lost, broken or misplaced and therefore not available at the time it is needed. The present invention solves the problem of a cook searching for the appropriate lid while the entree is cooking by providing a cookware lid able to cover a variety of pots and pans made by a variety of manufacturers.

As seen in FIG. 1, the cover 10 consists of a central portion 11 which includes a handle 12 located at about the center of the central portion 11. Other configurations of the handle 12 and locations of the handle 12 will be readily apparent to those skilled in the art. The central portion 11 extends generally radially outward until it meets the reverse curved portion, or straddle 13. The straddle, or reverse curved portion 13, bridges the gap between the central portion 11 and the flange 14. The flange extends generally radially outward to the skirt 15 (not shown in FIG. 1) located at the outer periphery 16 of the cover 10.

FIG. 2 further illustrates the construction of the cover 10 and the versatility that it provides. A conventional knob 12 is attached by conventional means, such as a screw 17, at or about the center of the central portion 11. The central portion 11 extends generally radially outward to the straddle 13. At the first curve 18 the straddle 13 extends generally vertically downward at wall 19 until the U-shaped curve 21 which reverses the direction of the straddle 13 extending it to the flange 14. The exterior surface 36 of the straddle 13 is disposed between the U-shaped curve 21 and the undersurface 38 of the flange 14. The flange 14 extends radially outward to the skirt 15. The skirt 15 extends generally downward and includes an interior surface 37 for engaging an outer surface 34 of a pan 30.

As seen in FIG. 2, the width of the flange 14 is sufficiently wide enough to accommodate cookware of varying diameters such as those represented by broken lines 23, 24. The generally flat but slightly upwardly angled orientation of the flange 14 provides a sufficient seal between the flange 14 and rims 35 of the cookware shown in dotted lines 23 and 24 respectively. The upwardly slope of flange 14 also facilitates the formation of a continuous line of contact between the flange and the upper rim of the underlying vessel; in essence it tends to form a tapered seat seal between the cover and vessel. The exterior surface 36 of the straddle 13 acts as a quasi-barrier inhibiting the escape of steam and vapor and often engages the inside surface 33 of a pan 30.

The lid 10 shown in the drawings provides a sufficient seal for cookware of varying diameters such as 23, 24 to enable the cooking of foods that must be covered while cooked, such as rice or hot cereals. The cover 10 as shown in the Figures is a suitable cover for sauce pans, frying pans, stock pots and other cookware. Thus, a cook need only employ one cover or replacement cover made in accordance with the present invention for each standard size cookware that he or she owns. For example, if a cook owns only 10-inch and 12-inch cookware, the cook need only own two covers or replacement covers made in accordance with the present invention in order to satisfy all of his or her cookware cover needs.

The upper rim 35 of the pan 30 will often be disposed snugly against the exterior surface 36 of the straddle 13 or the interior surface 37 of the skirt 15. By creating a snug fit between the inside surface 33 of the rim 35 and the exterior surface 36 of the straddle 13, or alternatively, the outside surface 34 of the rim 35 and the interior surface of the skirt 15, the present invention avoids a loose-fitting cover that would otherwise rattle when liquid in the pan 30 boils or allow hot liquid to easily escape during boiling or when the cook moves the pan 30 and cover 10.

Referring collectively to FIGS. 3 through 7, the cover 10 accommodates vessels 30 of both varying diameters and varying configurations. The cover 10 will engage the upper rim 35 of a pan 30 at four principal locations: the exterior surface 36 of the straddle 13; the junction 31 where the flange 14 meets the straddle 13; the undersurface 38 of the flange 14; the junction 32 where the flange 14 meets the skirt 15; and the interior surface 37 of the skirt 15. The diameter of the inside surface 33 of the upper rim 35 must be greater than or approximately equal to either the diameter of the exterior surface 36 of the straddle 13 or the inner diameter of the undersurface 38 of the flange 14 which is defined by the junction 31 where the flange 14 meets the straddle 13. The diameter of the outside surface 34 of the upper rim 35 must be less than or approximately equal to either the diameter of the interior surface 37 of the skirt 15 or the outer diameter of the flange 14 which is defined by the junction 32 where the flange 14 meets the skirt 15.

As can be seen from FIGS. 2 through 7, the cover 10 of the present invention accommodates cooking vessels 30 that not only vary in diameter but also in configuration. The cover 10 accommodates upper rims 35 that are relatively vertical (FIGS. 2, 5 and 7), upper rims 35 that flare outwardly (FIGS. 3 and 4) and upper rims 35 that are bowl-shaped (FIG. 6). It will also be noted that the present invention works well with cooking vessels having beaded rims.

In FIG. 3, the exterior surface 36 of the straddle 13 engages the inside surface 33 of the pan 30. Use of the exterior surface 36 of the straddle 13 as an engagement surface is most effective when the rim 35 of the pan 30 flares outwardly as seen in FIGS. 3 and 4. In FIG. 4, the interior surface 37 of the skirt 15 engages the outside surface diameter 34 of the pan 30. Use of the interior surface 37 as an engagement surface is most effective when the lip 35 extends downwardly as seen in FIG. 4.

In FIGS. 2, 5 and 7, the top of the rim 35 engages the undersurface of the flange 14. In FIG. 5, the inside surface 33 of the rim 35 engages the junction 31 where the straddle 13 meets the flange 14 and therefore a snug fit is provided between the inside surface 33 of the rim 35 and the exterior surface 36 of the straddle 13. In FIG. 6, the outside surface 34 engages the junction 32 where the flange 14 meets the skirt 15 and therefore a snug fit is provided between the outside surface 34 and the interior surface 37 of the skirt 15. It will also be noted the a beaded rim (not shown) may also engage the junction 32, the undersurface of the flange 14, or both.

Although a single preferred embodiment of the present invention has been illustrated and described, it will at once be apparent to those skilled in the art that variations may be made within the spirit and scope of the invention. Accordingly, it is intended that the scope of the invention be limited solely by the scope of the hereafter appended claims and not by the specific wording in the foregoing description.

We claim:

1. A cooking vessel cover, the cover for engaging upper rims of cooking vessels having varying diameters, the upper rims of the cooking vessels including inside and outside surfaces available for engagement with the cover, the cover comprising:

an upraised central portion, the central portion including a center and an outer periphery, means, connected to the outer periphery of the central portion, for providing a variable closure for cooking vessels of varying diameters, the means for providing a variable closure including
a straddle,
a flange, and
a skirt,
the straddle including an undersurface extending generally vertically downward before extending generally radially outward before curving vertically upward in a U-shaped turn and terminating at the flange, the straddle including a vertically-oriented exterior-facing surface disposed where the undersurface of the straddle curves vertically upward between the U-shaped turn and the flange, the vertically-oriented exterior-facing surface defining an extreme innermost vessel diameter with which the cover may be used, the flange connecting the vertically-oriented exterior-facing surface of the straddle to the skirt, the flange defining an inner diameter at a junction where the flange and the exterior-facing surface of the straddle meet, the flange further defining an outer diameter at a junction where the flange and the skirt meet, the flange including an undersurface for engaging upper rims of cooking vessels having diameters between the inner and outer diameter of the flange, the skirt extending generally vertically downward, the skirt including a vertically-oriented interior-facing surface and an exterior surface, the exterior surface of the skirt defining the extreme outermost periphery of the cover, a space defined by (a) the vertically-oriented exterior-facing surface of the straddle, (b) the undersurface of the flange, and (c) the vertically-oriented interior facing surface of the skirt being open and unobstructed so that any diameter vessel having an interior diameter no smaller than the diameter formed by the vertically-oriented exterior-facing surface of the straddle, or having an exterior less than the diameter formed by the vertically-oriented interior-facing surface of the skirt can be operatively engaged, the exterior-facing surface of the undersurface of the straddle providing a smooth surface for engaging inside surfaces of upper rims of cooking vessels, the interior-facing surface of the skirt providing a smooth surface for engaging outside surfaces of upper rims of the cooking vessels, the upraised central portion, the straddle, the flange and the skirt being fabricated from a unitary piece of metal.

2. A cover for engaging upper rims of cooking vessels having varying diameters, the cover comprising:

an upraised central portion, the central portion including a center and an outer periphery, means, connected to the outer periphery of the central portion, for providing a variable closure for cooking vessels of varying diameters, the means for providing a variable closure including a straddle, a flange, and a skirt, the straddle extending generally vertically downward before extending generally radially outward before curving generally vertically upward in a U-shaped turn and terminating at the flange, the straddle including an exterior-facing surface disposed where the straddle curves generally vertically upward between the U-shaped turn and the flange, the flange connecting the exterior-facing surface of the straddle to the skirt, the flange defining an inner diameter at a junction where the flange and the exterior-facing surface of the straddle meet, the flange further defining an outer diameter at a junction where the flange and skirt meet, the skirt extending generally vertically downward, the skirt including an interior-facing surface, the exterior-facing surface of the straddle, the flange and the interior-facing surface of the skirt providing smooth surfaces for engaging the upper rims of the cooking vessels of varying diameters, the upper rims having an inside surface diameter and an outside surface diameter, the cover engaging an upper rim of a cooking vessel without clearance therebetween (i) when the inside surface diameter of the upper rim is greater than or approximately equal to the inner diameter of the flange and (ii) when the outside surface diameter of the rim is less than or approximately equal to the outer diameter of the flange, the upraised central portion, the straddle, the flange and the skirt being fabricated from a unitary piece of metal.

3. A cover fabricated from a unitary piece of metal for engaging upper rims of cooking vessels having varying diameters, the cover comprising:

a central portion, the central including a center and an outer periphery, means connected to the outer periphery of the central portion, for providing a closure for cooking vessels of varying diameters, the means for providing a variable closure including a straddle, a flange, and a skirt, the straddle extending generally vertically downward before extending generally radially outward before curving generally vertically upward in a U-shaped turn and terminating at the flange, the straddle including an exterior-facing surface disposed where the straddle curves generally vertically upward between the U-shaped turn and the flange, the flange connecting the exterior-facing surface of the straddle to the skirt, the flange defining an inner diameter at a junction where the flange and the exterior-facing surface of the straddle meet, the flange further defining an outer diameter at a junction where the flange and skirt meet, The skirt extending generally vertically downward, the skirt including an interior-facing surface, the exterior-facing surface of the straddle, the flange and the interior-facing surface of the skirt providing smooth surfaces for engaging the upper rims of the cooking vessels of varying diameters, the upper rims having an inside surface diameter and an outside surface diameter, the cover engaging an upper rim of a cooking vessel without clearance therebetween (i) when the inside surface diameter of the upper rim is greater than or approximately equal to the inner diameter of the flange and (ii) when the outside surface diameter of the rim is less than or approximately equal to the outer diameter of the flange, the central portion, the straddle, the flange and the skirt being fabricated from a unitary piece of metal.

4. The cover of claim 3 further including a handle projecting upwardly therefrom for grasping and manipulating the cover.

* * * * *